2,881,210

PROCESS OF PREPARING p-AMINOMETHYL-PHENYLACETIC ACID

Harold E. Zaugg, Lake Forest, and Bruce W. Horrom, Waukegan, Ill., assignors to Abbott Laboratories, North Chicago, Ill., a corporation of Illinois No Drawing. Application August 13, 1956
Serial No. 603,815

3 Claims. (Cl. 260—518)

This invention relates to new chemical compounds and particularly to interesting new monomers and method for making them. The invention also relates to novel intermediates in the synthesis of said monomers.

The compounds of this invention are characterized by the chemical formula

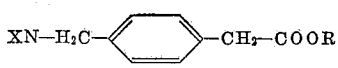

where XN is amino, diethylaminoacetylamino, phthalimido or chloroacetylamino. R is hydrogen or lower alkyl. The acid addition salts of said compounds are also included in the invention.

The compounds in which XN is amino and R is hydrogen or methyl are found to polymerize readily with heating to form linear polymers of the polyamide type, which are especially noted for their usefulness in the formation of filaments or threads. Polymerization takes place when the basic compound is heated, as on a steam bath.

The compounds in which XN is amino are readily prepared by hydrolysis of the compounds in which XN is phthalimido or chloroacetylamino. The compounds in which XN is amino may also be prepared directly from phenylacetic acid and N-hydroxymethylchloroacetamide or N-hydroxymethylphthalimide in cold concentrated sulfuric acid or in anhydrous hydrofluoric acid. Reaction under these conditions results in a high yield of the p-isomer and other isomers are obtained in small amounts, if at all. The reaction product is hydrolyzed while still in crude form and the reaction product is worked up by known methods to recover the p-aminomethylphenylacetic acid or ester. Other methods and the details thereof are explained in the following examples.

The following examples are presented in order to provide specific details of the invention. It is understood however that the invention is not to be limited in any way by the examples.

EXAMPLE I

*p-(N-phthalimidomethyl)-phenylacetic acid*

A well-pulverized mixture of 102 g. (0.75 mole) of phenylacetic acid and 88.5 g. (0.5 mole) of N-hydroxymethylphthalimide is added in portions over a period of 30 minutes to 180 ml. of concentrated sulfuric acid stirred in an ice bath. The temperature of the reaction is not allowed to rise above 20° C. during the addition. After stirring at room temperature overnight, the solution is allowed to stand for one week. It is then poured onto ice and stirred vigorously for several hours. After standing in water overnight, the solid is removed, dried and allowed to stand in ether overnight. Filtration and drying gives a product, M.P. 125–145° C. After fractional crystallization of this crude product using 95% ethanol and benzene separately as solvents, p-(N-phthalimidomethyl)-phenylacetic acid, M.P. 195–197° C., is obtained.

*Analysis.*—Calculated for $C_{17}H_{13}NO_4$: C, 69.15; H, 4.44. Found: C, 69.25; H, 4.55.

EXAMPLE II

*p-Chloroacetylaminomethylphenylacetic acid*

A well-pulverized mixture of 102 g. (0.75 mole) of phenylacetic acid and 62 g. (0.5 mole) of N-hydroxymethylchloroacetamide, M.P. 100–102° C., is treated according to the conditions specified in Example I. The ether insoluble fraction (65 g., M.P. 115–140° C.) is recrystallized once from 100 ml. of 95% ethanol to give p-chloroacetylaminomethylphenylacetic acid, M. P. 147–151° C. One more recrystallization gives analytically pure material, M.P. 152–153° C.

*Analysis.*—Calculated for $C_{11}H_{12}ClNO_3$: C, 54.66; H, 5.01; N, 5.80. Found: C, 54.77; H, 5.09; N, 5.72.

In place of concentrated sulfuric acid in this example and in Example I, we may use anhydrous hydrofluoric acid.

EXAMPLE III

*p-Aminomethylphenylacetic acid hydrochloride*

A solution of 13.4 g. (0.0454 mole of p-(N-phthalimidomethyl)-phenylacetic acid (Example I) and 1.52 ml. (0.0454 mole) of 95% hydrazine in 150 ml. of 95% ethanol is refluxed for 6 hours. The insoluble precipitate is removed by filtration, the filtrate is concentrated to dryness and the combined residue and filter cake are warmed several minutes at 55° C. with a solution of 20 ml. of concentrated hydrochloric acid in 100 ml. of water. After cooling to room temperature, the insoluble phthalhydrazide is removed by filtration, the filtrate is concentrated to dryness and the residue is washed with ether and dried to give 8.4 g. (92%) of p-aminomethylphenylacetic acid hydrochloride, M.P. 230° C. Recrystallization from glacial acetic acid gives product of M.P. 232–233° C. (dec.).

EXAMPLE IV

*p-Aminomethylphenylacetic acid hydrochloride*

A mixture of 10 g. of p-chloroacetylaminomethylphenylacetic acid and 50 ml. of concentrated hydrochloric acid is refluxed for 90 minutes. After refrigerating overnight, the crystallized product is removed by filtration and washed with successive portions of dry ethanol and ether. The p-aminomethylphenylacetic acid hydrochloride (7.80 g., 93%) thus obtained melts with decomposition at 232–233° C.

*Analysis.*—Calculated for $C_9H_{12}ClNO_2$: C, 53.60; H, 6.00. Found: C, 53.77; H, 6.21.

EXAMPLE V

*p-Aminomethylphenylacetic acid hydrochloride*

This product is also obtained readily without isolation of the intermediate p-chloroacetylaminomethylphenylacetic acid. In one run 116 g. of crude solid obtained in Example II, which had been washed with water, but not with ether, was hydrolyzed with 500 ml. of concentrated hydrochloric acid. The hot reaction mixture was filtered through a layer of charcoal, and pure p-aminomethylphenylacetic acid hydrochloride was obtained, M.P. 232–233° C.

EXAMPLE VI

*Methyl p-aminomethylphenylacetate hydrochloride*

A suspension of 20.15 g. (0.1 mole) of p-aminomethylphenylacetic acid hydrochloride in 250 ml. of dry methanol is saturated with dry hydrogen chloride during a period of about 90 minutes. The clear solution is then refluxed for another 90 minutes and refrigerated overnight. The methyl p-aminomethylphenylacetate (16 g., 75%) crystallizes in the form of long colorless blades, M.P. 215–217° C. This compound is a local anesthetic.

*Analysis.*—Calculated for $C_{10}H_{14}ClNO_2$: C, 55.68; H, 6.54; N, 6.49; O, 14.84. Found: C, 55.75; H, 6.71; N, 6.58; O, 14.84.

EXAMPLE VII

Ethyl p-diethylaminoacetylaminomethylphenylacetate 10 g. (0.0415 mole) of p-chloroacetylaminomethylphenylacetic acid, 6.9 g. (0.15 mole) of dry ethanol, 15 ml. of ethylene chloride, and 0.05 ml. of ethanesulfonic acid as catalyst are reacted by known methods. Ethyl p-chloroacetylaminomethylphenylacetate is obtained in the form of a nearly white solid, M.P. 79–81° C. For analysis, a sample is recrystallized from aqueous ethanol to give long white needles, M.P. 81–82° C.

*Analysis.*—Calculated for $C_{13}H_{16}ClNO_3$: C, 57.81; H, 5.97; N, 5.19. Found: C, 58.10; H, 6.13; N, 5.01.

A mixture of 8.07 g. (0.03 mole) of ethyl p-chloroacetylaminomethylphenylacetate, 6.2 ml. (0.06 mole) of diethylamine, and 50 ml. of dry benzene is heated in a stainless steel autoclave for 7 hours at 100° C. After cooling, the precipitated diethylamine hydrochloride is removed by filtration, and the filtrate is concentrated to dryness in vacuo. The residual oil is taken up in ether, washed with water, and dried over anhydrous magnesium sulfate. Removal of the drying agent by filtration followed by evaporation of the ether gives an oil which is distilled in vacuo to yield 8.3 g. (90%) of ethyl p-diethylaminoacetylaminomethylphenylacetate, B.P. 183–185° C./0.3 mm., M.P. 46–48° C.

*Analysis.*—Calculated for $C_{17}H_{26}N_2O_3$: C, 66.64; H, 8.55; N, 9.14; O, 15.67. Found: C, 66.36 H, 8.06; N, 9.17; O, 15.95.

This compound is a local anesthetic

Others may practice the invention in any of the numerous ways which will be suggested to one skilled in the art upon a reading of this specification. It is intended that all such practice of the invention be included hereunder provided it falls within the scope of the appended claims.

We claim:

1. In a method for preparing bases having the formula

the steps of condensing in cold concentrated mineral acid about three moles of phenylacetic acid with about two moles of a compound selected from the class consisting of N-hydroxymethylphthalimide and N-hydroxymethylchloroacetamide, and hydrolyzing the resulting reaction mixture, to obtain p-aminomethylphenylacetic acid.

2. In the method of making p-aminomethylphenylacetic acid, the steps which comprise condensing about three moles of phenylacetic acid with about two moles of N-hydroxymethylphthalimide in a concentrated mineral acid, to obtain p-(N-phthalimidomethyl)-phenylacetic acid, and refluxing with hydrazine to form p-aminomethylphenylacetic acid.

3. In the method of making p-aminomethylphenylacetic acid, the steps which comprise condensing about three moles of phenylacetic acid with about two moles of N-hydroxymethylchloroacetamide in a concentrated mineral acid, to obtain p-chloroacetylaminomethylphenylacetic acid, and refluxing with a mineral acid to form p-aminomethylphenylacetic acid.

References Cited in the file of this patent

Chem. Abstracts, Decennial Index, vols. 11–20, p. 6312 (1917–1926).

Braun et al.: Liebig's Ann., vol. 445, pp. 238–246 (1925).

Braun et al.: Chem. Abstracts, vol. 20, p. 391 (1926).